UNITED STATES PATENT OFFICE.

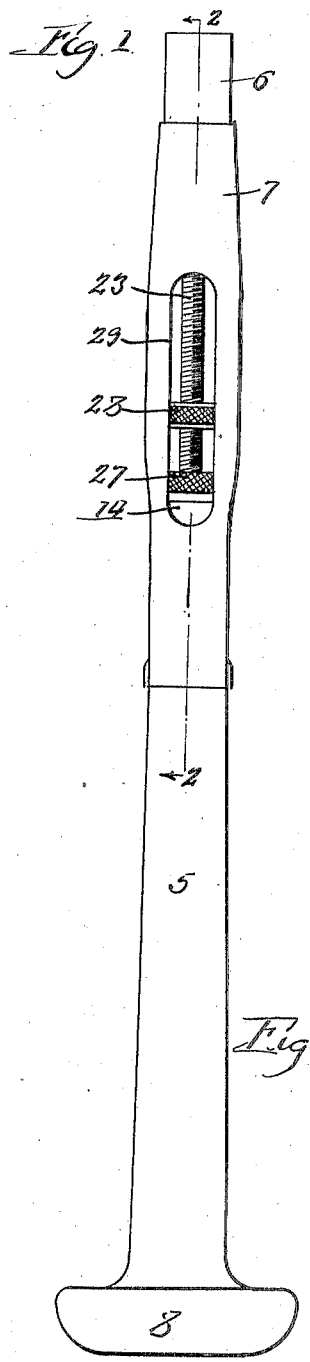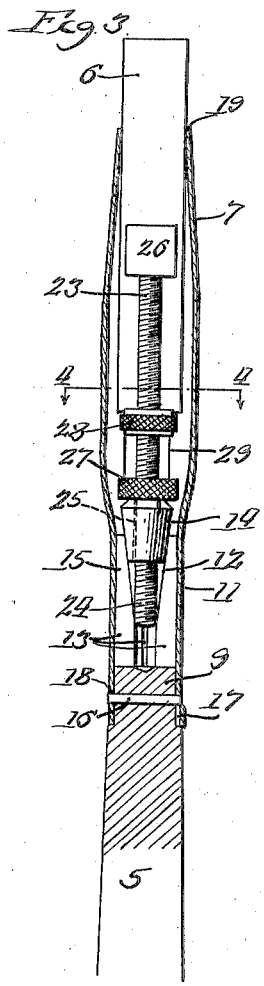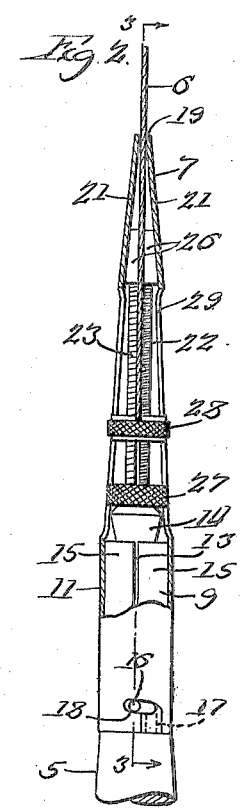

CARL L. AAGAARD, OF ROCKFORD, ILLINOIS.

HAND SCRAPING-TOOL.

1,345,658.   Specification of Letters Patent.   Patented July 6, 1920.

Application filed March 12, 1919. Serial No. 282,238.

*To all whom it may concern:*

Be it known that I, CARL L. AAGAARD, a citizen of the United States, residing at Rockford, in the county of Winnebago and State of Illinois, have invented certain new and useful Improvements in Hand Scraping-Tools, of which the following is a specification.

This invention pertains in general to hand tools, and has more particular reference to the provision of hand tools or holders especially adapted for carrying scraping blades.

One of the primary objects of the present invention is to provide a blade holder of novel construction which shall permit of quick and easy adjustment of the blade as it becomes worn and which shall hold the blade very rigidly and effectively for the purposes of a tool of this character. In other words, I have aimed to provide a hand tool especially designed to carry a comparatively long blade in such manner that only the working end of the blade is projected from the holder or shank for use, and including a novel adjusting means by which the blade as it becomes worn, may be projected from the holder, thus giving a scraping tool which may be used very efficiently for a relatively long period of time.

Another object is to so construct the several parts as to promote convenience and accuracy in operation, and in this connection attention is especially directed to the shape of the handle and of the blade shank or casing which will be described more fully hereinafter.

A further object is to construct the several parts in such simple manner as to enable production at a comparatively low cost, and to this end I have designed an exceedingly simple and novel means for locking the blade in the shank and for adjusting the blade as by projecting its working end more or less from the shank or holder. I have also made provision for quick disassembling of the tool so that the blade might be easily inserted or removed, and in promoting simplicity and practicability, I employ a common means for locking or rigidly securing the blade-holding shank to the handle and the blade to the shank.

Other objects and attendant advantages will be appreciated as the invention becomes better understood by reference to the following description when considered in connection with the accompanying drawings, in which—

Figure 1 is a side view of a scraping tool embodying my improvements;

Figs. 2 and 3, longitudinal sectional views through the tool taken substantially on the section lines 2—2 of Fig. 1 and 3—3 of Fig. 2, respectively;

Fig. 4, a cross-sectional view taken on the line 4—4 of Fig. 3, and

Fig. 5 is a detail view of the inner end of the scraper blade.

My invention contemplates, generally stated, the provision of a hand scraper comprising a handle 5, a scraping blade 6, a blade casing or shank 7, and means which will be presently described, operating between the handle and shank for holding the blade in working position. The handle 5 preferably formed of wood, as an enlarged "mushroom" hand grasp 8 for convenience of operation. The reduced opposite end 9 of the handle fits snugly in the annular socket 11 of the shank and is provided with a central tapered socket 12 intersected by quarteringly arranged longitudinal slots 13. By means of a tapered annular block 14 fitting in the socket 12 and adapted to be forced thereinto by means which will be presently described, the separated portions 15 of the handle will be expanded and so compressed between the wedge block 14 and the walls of the shank socket 11 as to rigidly secure the shank to the handle. By loosening the wedge block 14, the handle will obviously be free for withdrawal from the shank 7. In order to draw the end 9 of the handle fully into the socket 11 of the shank when assembling the tool, I have equipped the handle with a transverse pin 16, the ends of which are adapted to enter the diametrically opposed slotways 17 in the shank and by rotative movement of the shank relatively to the handle the ends of the pin 16 are moved into the inclined slotways 18, and by engagement therewith draw the reduced end 9 of the handle fully into the socket of the shank. Thus by means of the locking of the wedge block 14 and the pin 16, the shank will be very rigidly secured to the handle, and at the same time the construction permits of quick assembling and disassembling.

It will be noted that the scraping blade 6 is comparatively long and that the shank 7 completely houses the blade with the exception of the working end thereof. This working end of the blade is guided by the walls of the opening 19 in the end of the shank, and as shown in Fig. 2, the opposite walls 21 of the shank converge toward the opening 19. The inner end of the blade is disposed in the diametric slot 22 in a threaded locking member 23, the inner end 24 of which extends loosely through an aperture 25 in the wedge block 14. The separated ends of the threaded member are equipped with tapered heads 26 coöperating with the inclined surfaces 21 of the shank, and by forcing the threaded member 23 outwardly toward the opening 19, it will be manifest that the tapered blocks 26, by reason of their wedging engagement with the surfaces 21, will clamp the blade 6 in rigid connection with the shank. For the purpose of thus forcing the threaded member 23 lengthwise, I have mounted a locking nut 27 thereon adjacent to the outer end of the wedge block 14, so that by turning the nut 27 in one direction it will serve to force the wedge members 14 and 26 in opposite directions and simultaneously bind the shank to the handle and the blade to the shank. It will be noted, however, that the shank is held against lengthwise movement by the pin 16. I have now provided a separate means in the form of a nut 28 on the member 23 for backing the blade 6 and for moving the same outwardly through the opening 19 after the locking nut 27 has been loosened. The nut 28 and the adjoining end of the blade are shaped to interfit, as noted in Figs. 3 and 5, for holding the blade in alinement. This construction permits free rotation of the nut 28 after the nut 27 has been loosened, the purpose of such rotation being either to move the blade outwardly to a more extended position or to permit setting the blade farther into the holder. The nut 28 constitutes an adjustable seat for the blade, taking directly the end thrust thereof, and the interfitting connection holds the inner end of the blade against lateral displacement. The shank 7 is slotted longitudinally on opposite sides as at 29 so as to allow access to the nuts 27 and 28. It will be noted that the shank 7 completely houses the several parts employed for locking and holding the blade and presents an exteriorly smooth and rounded surface and thus protects the operator from sharp and rough edges as are found on other scraping tools, which are apt to injure the hands by use of the tool.

From the foregoing, it will be seen that I have provided a very simple means for rigidly securing a scraping blade in position and for permitting quick adjustment of the blade, or complete removal thereof from the holder, if desired. To completely disassemble the tool, the nut 27 will be loosened, thereby freeing the shank and the handle so that the latter by a slight rotative movement to bring the ends of the pin 16 in alinement with the slots 17, may be withdrawn from the shank. The parts 14, 23, 27 and 28 may then be removed through the socket 11.

It is believed that the foregoing conveys a clear understanding of the principles of my invention and of the objects prefaced above, and while I have illustrated but one working embodiment thereof, it should be understood that various changes might be made in the construction and arrangement without departing from the spirit and scope of the invention as expressed in the appended claims, in which—

I claim:

1. A scraper comprising a handle equipped with a blade holder having a blade opening and inner walls converging toward said opening, a blade slidable through said opening, an exteriorly threaded member interposed at one end between the blade and one of said converging walls, a nut on said member adjustable to force the same into wedging engagement with said wall and thereby rigidly secure the blade to the holder, the blade being adjustable lengthwise independently of the threaded member, and a second nut on the threaded member providing an end thrust seat for the inner end of the blade and adjustable lengthwise on said member to determine the position of the blade as regards inward movement.

2. A scraper comprising a handle equipped with a blade holder, a blade movable lengthwise with respect to the holder, threaded means coöperating with the blade holder and adjustable to rigidly secure the blade in connection therewith, and a nut provided with a blade seat and adjustable on the said threaded means for adjusting the blade lengthwise of the holder independently of lengthwise movement of said threaded means.

3. A blade or tool holder of the character described comprising a handle, a blade casing removably mounted on the handle, a blade within the casing adapted to be adjusted lengthwise thereof to project its working end more or less therefrom, an exteriorly threaded member in coöperative relation at one end with the casing through the agency of inclined surfaces, a nut on the threaded member providing an end thrust seat for the inner end of the blade and adjustable lengthwise on said member to determine the position of the blade as regards inward movement, and a second nut on the threaded member for moving the same lengthwise with respect to the handle for rigidly securing the blade to the casing by wedging action of said inclined surfaces.

4. A blade or tool holder of the character described comprising a handle, a blade casing removably mounted on the handle, a blade within the casing adapted to be adjusted lengthwise thereof to project its working end more or less therefrom, a threaded member within the casing, means operative between said member and the blade for adjusting the latter longitudinally of the casing, and means operative between the threaded member and the handle and between the threaded member and the casing for rigidly securing the casing to the handle and the blade to the casing.

5. A blade holder of the character described comprising a shank having a blade opening and inner walls converging toward said opening, an exteriorly threaded and diametrically slotted member extending longitudinally in the shank, the parted ends of said member being equipped with tapered portions coöperative with the inner converging sides of the shank, a blade passing through the opening in the shank and disposed in the slotway of said threaded member, a nut on the threaded member for projecting the blade through the shank opening, and a second nut on the threaded member for moving said tapered portions into a wedging engagement with the converging walls to rigidly secure the blade in connection with the shank.

6. A blade holder comprising a handle having a tapered socket at one end, a blade casing detachably mountable at one end on the handle and shaped at its opposite end to provide converging inner walls and a blade opening, a blade slidable lengthwise through said opening, a tapered member seated in said tapered socket and having a central opening, a threaded member loose in said opening and provided with a tapered portion interposed between the blade and one of said converging walls of the casing, and means threadingly engaging said threaded member and coöperating with said tapered member for forcing the latter and the tapered portion of the threaded member in opposite directions to rigidly secure the blade to the casing.

7. A scraping tool comprising a handle, a blade holder body of tubular construction having a socket at one end for the reception of said handle, means operative between the handle and blade holder body for holding the same against relative lengthwise movement but permitting separation thereof at will, said handle having a tapered socket within the blade casing body, said body at its outer end having converging walls terminating in a blade opening, a blade disposed within said body and movable lengthwise through said opening, and means including a tapered part fitting in said tapered socket in the handle, a second tapered part operable between the blade and one of the converging walls of the blade casing body, and means for moving these tapered parts lengthwise for rigidly securing a blade to said body and the body to the handle.

8. A scraping tool comprising a handle, a scraper casing having a socket into which the handle is inserted, said inserted end of the handle having a tapered socket, a blade movable lengthwise within said casing and having a scraping end projecting therefrom, said casing having a tapered wall in juxtaposition to said blade, a threaded member within the casing equipped with a tapered part disposed between the blade and said tapered casing wall and equipped also with a tapered part disposed in said tapered socket in the handle, and a nut on said threaded member coöperating with the tapered part in said socket for moving the threaded member lengthwise to thereby rigidly secure the blade to the casing and the casing to the handle.

9. A scraping tool comprising a handle, a scraper casing mounted on the handle and having converging inner walls terminating in a scraper opening, a scraper blade within the casing movable lengthwise through said opening, a threaded member within the casing and slotted diametrically for the reception of the inner end of the blade, the outer separated ends of said threaded member being equipped respectively with tapered portions disposed intermediate the blade and said converging walls, a nut on the threaded member providing an adjustable seat for the inner end of the blade, and means operable between the threaded member and casing for rigidly securing by lengthwise adjustment of said threaded member, the blade to the casing.

10. A scraping tool comprising a handle, a tubular blade casing having a socket at one end for the reception of said handle and having a blade opening at its opposite end and inner walls converging toward said blade opening, the handle having a tapered socket within said casing socket, a blade within the casing movable lengthwise through the blade opening, a threaded member carrying tapered parts coöperating respectively with said tapered socket and one of said converging walls, and means threadingly engaging said member and operable to force said tapered parts in opposite directions to rigidly secure the blade to the casing and the casing to the handle.

11. A scraping tool comprising a casing having a blade opening and inner walls converging thereto, a blade within the casing movable lengthwise through said opening, a threaded member slotted diametrically for the reception of the inner end of the blade, a nut on said threaded member providing an adjustable seat for the inner end of the blade, the separated outer ends of the threaded member having tapered portions disposed between the blade and the adjacent converging walls of the casing, and means including a second nut on said threaded member for moving the latter and its tapered parts lengthwise for rigidly securing the blade to the casing.

CARL L. AAGAARD.